Figure 1:
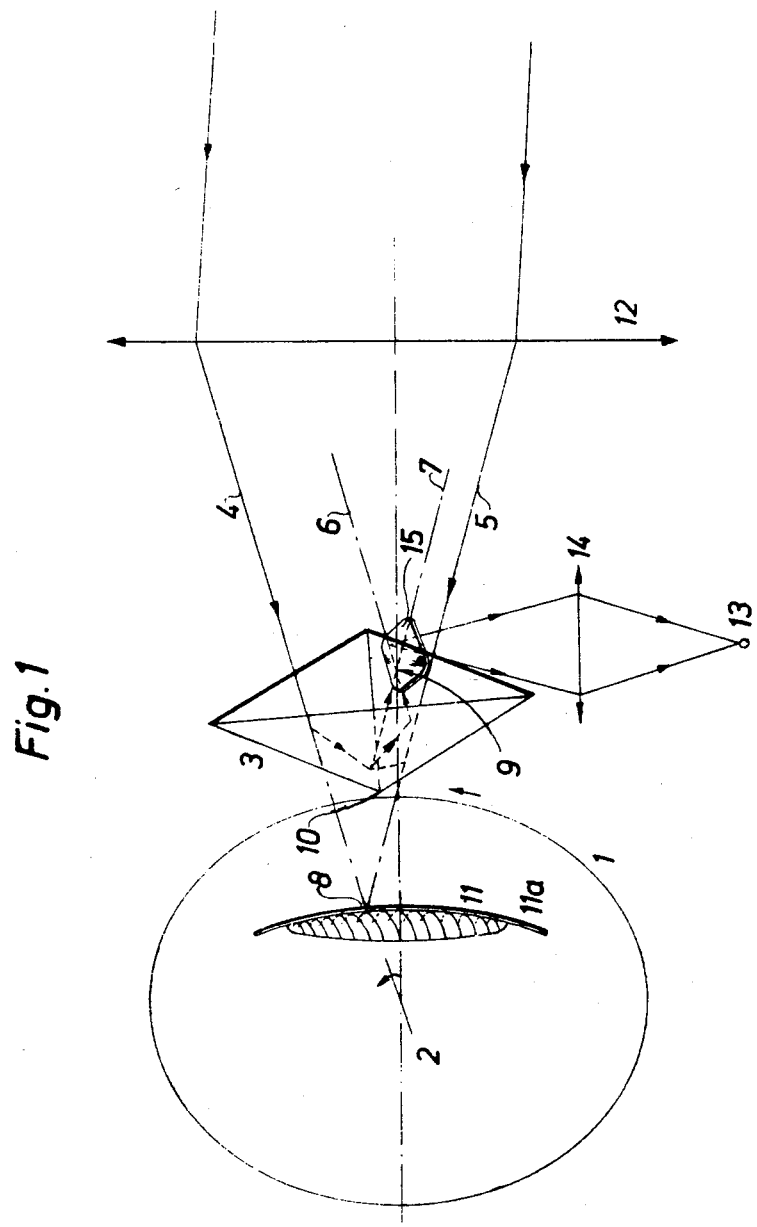

OR 3,802,759

United States Patent
Andersson

[11] 3,802,759
[45] Apr. 9, 1974

[54] DEVICE FOR OPTICAL-MECHANICAL SCANNING OF IMAGES BY MEANS OF CORNER REFLECTORS

[75] Inventor: Jens Karl-Olof Andersson, Lidingo, Sweden

[73] Assignee: AGA Aktiebolag, Lidingo, Sweden

[22] Filed: May 18, 1972

[21] Appl. No.: 254,444

[30] Foreign Application Priority Data
May 21, 1971  Sweden .................. 6589/71

[52] U.S. Cl. ............ 350/7, 350/287, 350/102, 350/103
[51] Int. Cl. ............................ G02b 17/00
[58] Field of Search ............ 350/6, 7, 286, 287, 97, 350/102, 103

[56] References Cited
UNITED STATES PATENTS

| 3,647,956 | 3/1972 | Buck | 350/7 |
| 3,632,871 | 1/1972 | Wathins | 350/7 |
| 3,170,982 | 2/1965 | Hemstreet | 350/102 |
| 1,813,874 | 7/1931 | Eskilson | 350/102 |
| 2,213,061 | 8/1940 | Zillger | 350/7 |

Primary Examiner—Ronald L. Wibert
Assistant Examiner—Michael J. Tokar

[57] ABSTRACT

Device for optical-mechanical scanning of an image using a detector comprising a rotatable drum fitted with corner reflectors in order to transform optical signals from different image points into corresponding electric signals by means of a transformer, the corner reflectors consisting of three reflecting surfaces, pairwise forming essentially right angles with one another and so arranged that the three reflecting surfaces converge in a three-dimensioned, essentially right-angled corner having the reflecting surfaces inside the corner.

8 Claims, 5 Drawing Figures

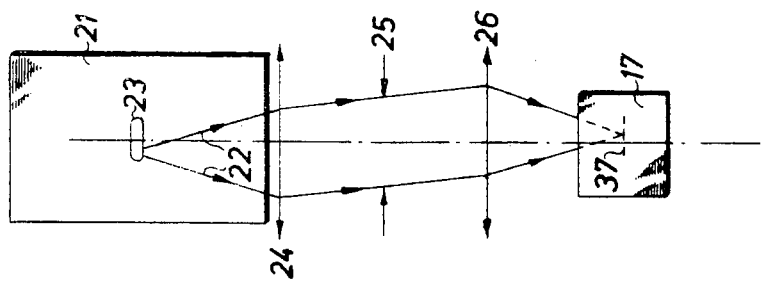
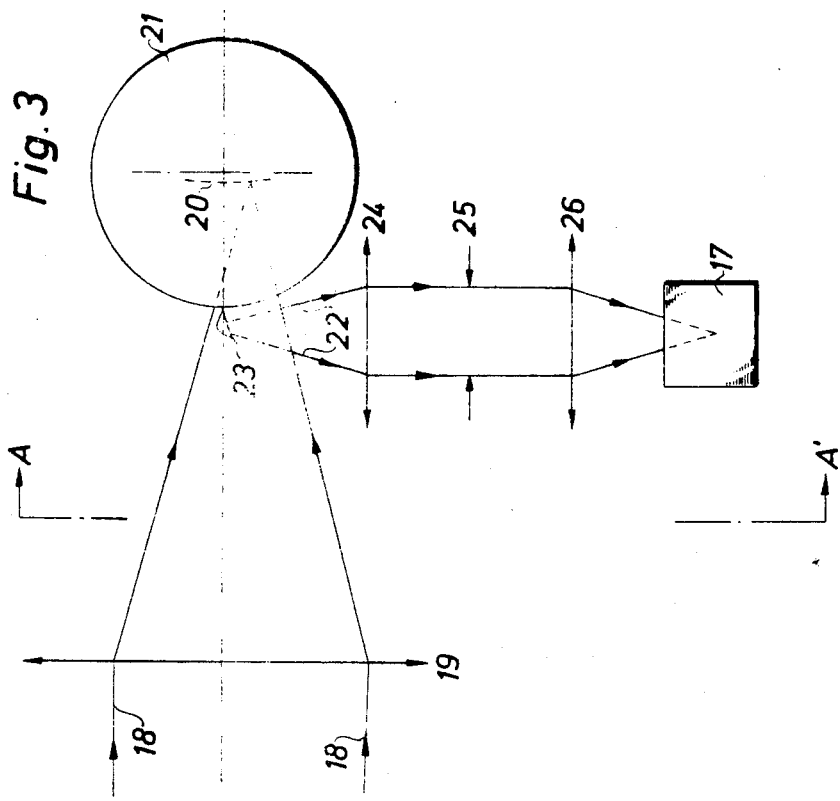

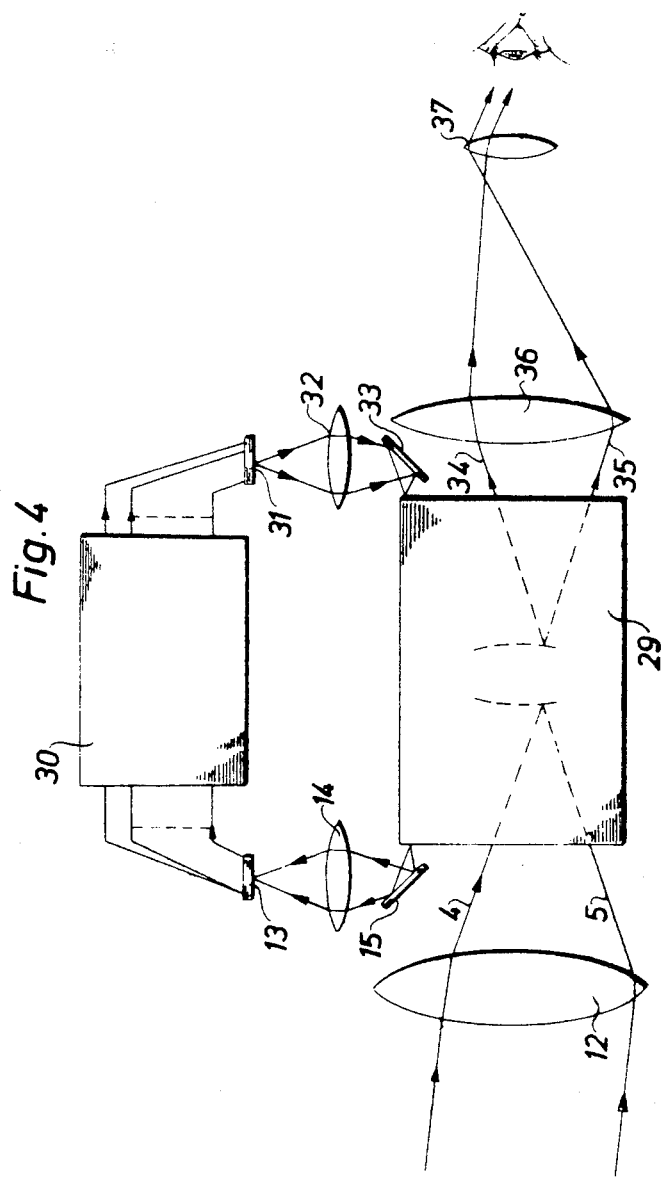

DEVICE FOR OPTICAL-MECHANICAL SCANNING OF IMAGES BY MEANS OF CORNER REFLECTORS

The invention relates to a device for optical-mechanical scanning of images by means of corner reflectors, i.e., reflectors composed of a number of plane reflecting surfaces forming a given angle with one another.

Image scanning, especially within the infrared wavelength range, is done wholly or partially mechanically by periodical movement of one or more optical elements in relation to a radiation-sensitive detector. It is also possible to arrange optical system and detector rigidly connected to one another and let this unit periodically scan an object or a generated image.

The scanning sweep must take place at very high speed if a good reproduction of the scanned image is to be obtained. The main difficulty in this respect is of a mechanical nature, whereas in electronic processes very high speeds can be attained. To overcome the mechanical difficulties the method of utilizing rotational movements is known, for example by using a rotatable drum scanner with star-shaped cross-section in which adjacent plane mirrors pairwise from a right angle, so creating corner reflectors. With a suitably placed detector, scanning can then take place by means of a sweep of sawtooth shape with high sweep frequency and extremely rapid return. With this device, however, only one line in the image plane can be scanned.

The present invention relates to a device for optical-mechanical scanning, with which several lines in succession can be scanned so that they form a raster of TV type. By optical is meant here and in the sequel a range of wavelengths of such magnitude that the laws of geometrical optics apply.

The device comprises a rotatable drum with several corner reflectors and the invention is characterized chiefly in that the corner reflectors are formed by three reflecting surfaces facing one another, pairwise forming an essentially 90° angle with one another and so arranged that the reflection surfaces converge in a three-dimensional, essentially perpendicular corner.

A corner reflector formed in this way has the property that, with exceptions of no interest in this connection, the incident rays are reflected 180° in relation to their direction of incidence. The reflected rays are, however, displaced in parallel, which permits the use of a suitable optical system for indication of an image without thereby concealing the incident rays.

The corner reflectors according to the invention can be placed either on the outside or inside of the rotatable drum, so allowing the choice between convex and concave image surface.

The corners of the corner reflectors can be placed on or inside the rotatable drum along a circle, the plane of which is perpendicular to the axis of rotation, but according to an advantageous further development of the invention the corners of the corner reflectors are arranged along a helix, the geometrical central axis of which coincides with the axis of rotation. In this way the image scanning takes place line by line, forming a raster.

According to a further development of the invention the corners of the corner reflectors are arranged at different distances from the axis of rotation and axially displaced in relation to one another. In this way the image plane scanned by the corner rotor can be brought into coincidence with part of a spherical surface, for example the image plane of the lens.

The device according to the invention thus permits not only image scanning line by line to form a raster, but also the scanning of a spherical surface so that full definition is obtained both from the central part and from the periphery of the image.

For use of the device for image scanning according to the invention within the infrared wavelength range it may be desirable to obtain a directly observable image. The same corner rotor as is used for the image scanning can be used for projection of a directly observable image. The signals generated in the detector by the corner rotor after the image scanning can in such case be used for modulation of a light source. The modulated rays of light are directed by a suitable optical system towards the corner rotor, for example at a point diametrically opposite to that at which scanning takes place. As described below with reference to the attached drawings, the corner rotor here serves as projector, the path of the rays thus being the reverse of that in the corner reflector when the latter is used for image scanning. In this way a directly observable image can be obtained by means of additional lenses.

Figure 2:
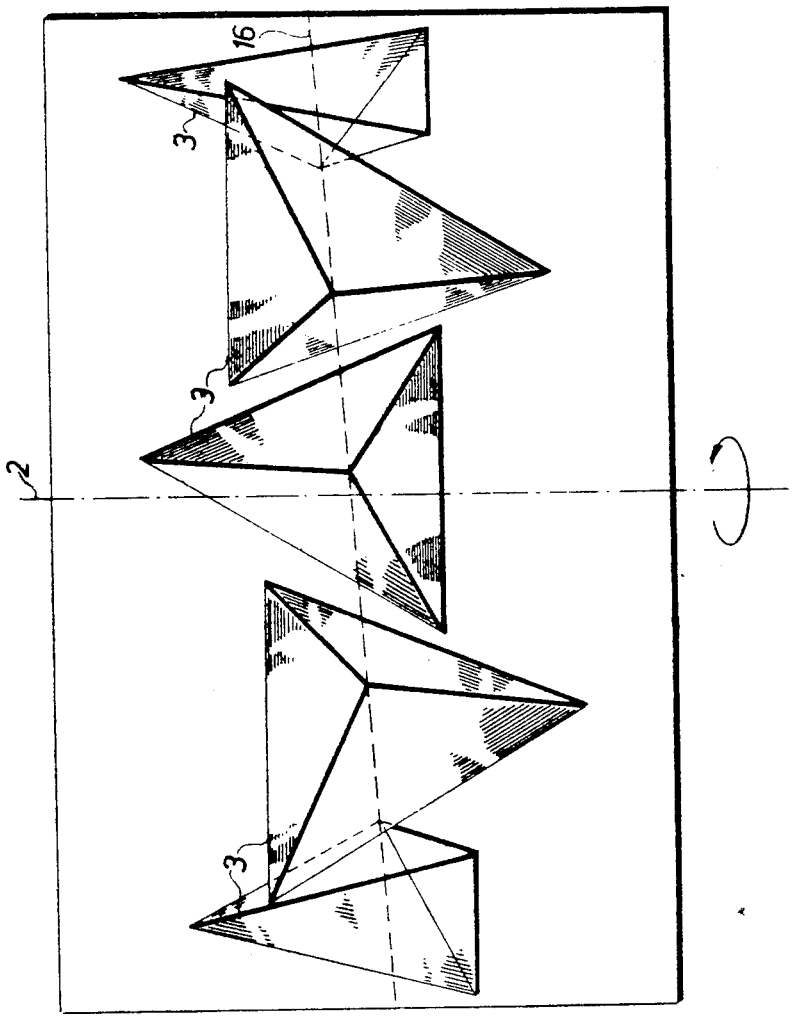

Some embodiments of the invention will now be described with reference to the attached drawings, of which FIG. 1 shows schematically the path of the rays in an arrangement with external corner reflector with associated optical system and detector, FIG. 2 shows a side view of a rotatable drum with spirally arranged corner reflectors, FIG. 3 shows schematically how a device according to the invention is used for scanning the field of view from a lens, and FIG. 3A is a view along lines A-A' of FIG. 3.

FIG. 4 shows schematically how the device according to the invention can be used for projection of the scanned image for direct observation.

FIG. 1 shows two rays incident on a lens 12 which, as marked by 4 and 5, converge towards a point 8. Along a circle 1 of a drum not shown in the drawing are placed a member of corner reflectors 3 according to the invention, only one of which is shown. This corner reflector is composed of three reflecting surfaces which pairwise form an angle of 90° to one another and are so arranged that they all meet in a corner 10, which thus constitutes a three-dimensional perpendicular corner. The converging rays 4, 5 incident on the corner reflector are reflected once against each of the surfaces of the corner reflector and, on leaving the corner reflector, have the directions marked 6 and 7. The outgoing rays are thus inversely parallel to the incoming rays, but their common plane is not on the same plane as that of the incident rays 4 and 5. The outgoing rays 6 and 7 intersect one another at a point 9.

As the outgoing rays 6, 7 from the corner reflector are not on the same plane as that of the incoming rays 4, 5, a mirror 15 can be placed in the path of the outgoing rays without concealing the incoming rays. After reflection in the mirror 15 the rays are directed towards an optical relay system 14 and a detector 13.

The corner reflector thus gives rise to a point 9, the reflected image of which is point 8. When the drum rotates around its axis 2, the corner reflector 3 describes the arc 1, so that the reflected image 8 of the point describes an arc 11a the radius of which is twice as large as that of the arc 1. By suitable dimensioning of the drum and its distance to the lens 12, the curve 11a can be brought onto the image plane 11 of the lens 12. During the rotation the detector thus scans the curve 11a on the image plane of the lens, and thus a line in the space of the object.

If the corners of all corner reflectors lie on the same arc 1, i.e., on a common plane of rotation, the image 8 of the point 9 describes the curve 11a for all reflectors. If, on the other hand, the corners are displaced slightly axially in relation to one another so that they lie on a helical line 16, as shown in FIG. 2, the point 8 describes different curves corresponding to the curve 11a for every corner reflector 3. These curves consist of arcs on a common cylindrical surface. If, on the other hand, the corner reflectors 3 are placed at different distances from the axis 2 of the drum, and so that these distances are in a given relation to the pitch of the helix, the curves can be made to follow arcs of different radius in such a way, that they lie on a common spherical surface.

It is also possible to arrange the corner reflectors on the inside of the rotatable drum, the incident rays being directed essentially axially in relation to the drum. By means of a mirror placed inside the drum the rays can then be directed radially towards the corer reflectors and, after reflection in them, pass through a central hole in the mirror, thereafter being deflected by a new mirror essentially axially in relation to the drum and out from it.

If the internal corner reflectors are placed along a helix, a reflected image is obtained, as above, which follows a number of parallel arcs lying on a common cylindrical surface; and if the distances of the corner reflectors to the axis of the drum differ, arcs are obtained in the same way as above on a common spherical surface. The device according to the invention thus makes it possible to scan both convex and concave image surfaces.

In FIG. 3 is shown how a corner reflector rotor can be used for scanning the field of view of a lens. A block 17 contains, for example, a single-element detector, a multielement detector, a single-element detector and an optical-mechanical scanning unit or a multielement detector and an optical-mechanical scanning unit.

An incident beam 18 from a given direction in the space of the object is focused by a lens 19 in an image plane 20. The corner reflector rotor 21 and the block 17 scan the image plane point by point, i.e., direction by direction, in the space of the object. For a given position of the block 17 the corner reflector rotor scans one or several separate lines in succession in the image plane 20. The beam 22 leaving the corner reflector rotor is reflected by a mirror 23 to a lens 24, which collimates the beam, which is thereafter limited by a diaphragm 25. The beam is then focused by a lens 26. Additional scanning with an optical-mechanical device or electronically with a multielement detector can be done in the block 17. Scanning in the block 17 is best done perpendicular to the rotary scanning by the corner reflector rotor.

A corner reflector rotor in combination with a multielement detector can be made to scan several separate lines, the number of lines being the product of the number of element detectors and the number of corner reflectors. In this case the corner reflectors must not lie on the same plane of rotation and, by suitable placing of the corners along a helix and suitable spacing between the outer elements in the detector, a raster can be scanned in the image plane of the lens so that the distance between the lines is constant. The distance between the detector elements in the direction away from the axis of rotation of the corner reflector rotor must then be constant.

The corner reflector rotor in combination with an additional optical-mechanical scanning unit, which may also be a corner reflector, and a single-element detector can be made to scan a raster with constant distance between lines. The two optical-mechanical scanning units must in such case have axes of rotation essentially perpendicular to one another in order to scan a raster of TV type.

In FIG. 4 is shown how a device according to the invention can be used for projection of the scanned image for direct observation. Image scanning then takes place in the manner indicated above, so that a beam 4, 5 passing through the lens 12 is directed by the corner reflector rotor 29 and a combined mirror and lens system 14, 15 towards the detector 13. In a block 30 the signals generated by the detector 13 are processed and the signals leaving the block 30 are caused to modulate a light source 31. The outgoing beam from the modulated light source 31 is directed by a combined lens and mirror system 32, 33 towards the corner rotor 29, and the beam entering the corner rotor converges to a point roughly diametrically opposite to the point at which image scanning takes place. After reflection in the corner reflectors an outgoing beam 34, 35 is obtained and, after passage through lenses 36, 37 a directly observable image is obtained. Thus, in this way, with a single corner rotor according to the invention, a directly observable image can be generated from an incoming beam, which is especially advantageous in the case of incoming infrared radiation. It is, of course, also possible to project an image on a photographic film or on a light-sensitive screen of a TV camera tube for photographic recording or conversion to TV signals.

Although the invention has been described with reference to some of its embodiments, it can nevertheless be arbitrarily varied within the scope of the subsequent claims.

What I claim is:

1. A device for optical-mechanical scanning of an image plane using a detector comprising
   a. a rotatable drum,
   b. at least one corner reflector located on the circumference of said drum, said corner reflector including three reflecting surfaces, each at right angles to the other two reflecting surfaces and meeting at a right-angled corner having the reflecting surfaces inside the corner,
   c. said drum being rotatable about an axis of rotation,
   d. said right-angled corner of said corner reflector being located on a surface formed concentrically with the surface of said drum, and in a plane perpendicular to said axis of rotation, and
   e. said corner reflector being positioned to reflect incident convergent rays traveling parallel to said axis of rotation to produce reflected rays which are inverted with respect to said incident rays, said reflected rays being located in a displaced parallel plane of said incident rays.

2. A device in accordance with claim 1 including a mirror positioned adjacent to said corner reflector, and located within the plane of said reflected rays to deflect said reflected rays without interfering with said incident rays.

3. A device in accordance with claim 2 including detector means positioned to receive optical signals reflected from said mirror and transform said optical signals into electrical signals.

4. A device in accordance with claim 1 wherein the corner reflectors are placed on the outside of the rotatable drum so that the reflecting surfaces are directed away from the axis of rotation.

5. A device in accordance with claim 1 wherein the corner reflectors are placed on the inside of the rotatable drum so that the reflecting surfaces are directed towards the axis of rotation.

6. A device in accordance with claim 1 including a plurality of said corner reflectors, and wherein the right angled corners of the corner reflectors are located on a circle, said circle being located in a plane which is perpendicular to the axis of rotation.

7. A device in accordance with claim 1 including a plurality of said corner reflectors, and wherein the right angled corners of the corner reflectors are located along a helix having a geometrical central axis which coincides with said axis of rotation of said drum.

8. A device in accordance with claim 1 including a plurality of said corner reflectors and wherein the right angled corners of the corner reflectors are located in separate planes perpendicular to said axis of rotation of said drum, said right angled corners being radially and axially displaced in relation to one another, and with respect to said axis of rotation of said drum whereby the image plane scanned by the corner reflectors can be caused to coincide with part of a spherical surface.

* * * * *

UNITED STATES PATENT OFFICE
CERTIFICATE OF CORRECTION

Patent No. 3,802,759           Dated   April 9, 1974

Inventor(s)  JENS KARL-OLOF ANDERSSON

It is certified that error appears in the above-identified patent and that said Letters Patent are hereby corrected as shown below:

Column 1, line 25, "from" should read -- form -- .

Column 3, line 27, "corer" should read -- corner -- .

Signed and sealed this 13th day of August 1974.

(SEAL)
Attest:

McCOY M. GIBSON, JR.            C. MARSHALL DANN
Attesting Officer               Commissioner of Patents